United States Patent [19]

Ueda

[11] Patent Number: 5,699,472
[45] Date of Patent: Dec. 16, 1997

[54] MOTION PICTURE REPRODUCING SYSTEM BY BIDIRECTIONAL COMMUNICATION

[75] Inventor: Hiroaki Ueda, Tokyo, Japan

[73] Assignee: NEC Corporation, Tokyo, Japan

[21] Appl. No.: 616,341

[22] Filed: Mar. 15, 1996

[30] Foreign Application Priority Data

Mar. 17, 1995 [JP] Japan ................... 7-058823

[51] Int. Cl.[6] .............. H04N 5/76; H04N 7/10; H04N 7/14
[52] U.S. Cl. .................. 386/46; 386/125; 348/13
[58] Field of Search ............ 386/45–46, 125–126; 348/7, 10, 12, 13; 395/335; 455/3.1–3.2, 5.1; H04N 5/76, 7/10, 7/14

[56] References Cited

U.S. PATENT DOCUMENTS

| | | | |
|---|---|---|---|
| 5,471,316 | 11/1995 | Sugawara et al. | 386/125 |
| 5,594,490 | 1/1997 | Dawson et al. | 348/12 |
| 5,613,192 | 3/1997 | Ikami et al. | 348/12 |
| 5,617,135 | 4/1997 | Noda et al. | 348/12 |
| 5,621,455 | 4/1997 | Rogers et al. | 348/12 |
| 5,621,729 | 4/1997 | Johnson et al. | 348/13 |
| 5,630,204 | 5/1997 | Hylton et al. | 348/12 |

FOREIGN PATENT DOCUMENTS

| | | |
|---|---|---|
| 0624039 | 11/1994 | European Pat. Off. . |
| 0633694 | 1/1995 | European Pat. Off. . |
| 1-273269 | 11/1989 | Japan . |
| 4-245789 | 9/1992 | Japan . |
| 5-300495 | 11/1993 | Japan . |

OTHER PUBLICATIONS

J.D. Calvet et al., "Interactive videocommunication evolution", *Electrical Communication*, 3rd Quarter, Paris, FR, 1994, pp. 281–289.

W. Leo Hoarty, "Multimedia on Cable Television Systems", *18th International Television Symposium and Technical Exhibition*, Symposium Record Cable Sessions, Jun. 11, 1993, pp. 555–567.

*Primary Examiner*—Thai Tran
*Attorney, Agent, or Firm*—Sughrue, Mion, Zinn, Macpeak & Seas, PLLC

[57] ABSTRACT

A motion picture reproducing system by bidirectional communication, in which characters and graphics are separately encoded to reproduce high quality images. A video server transmits the motion picture codes of the desired video to a terminal in response to a request of the terminal. At that time, by checking a terminal registration information file, it is discriminated whether or not a bit map of the characters and the graphics stored in the user region of the motion picture codes is registered in the terminal. When the bit map is not registered in the terminal, the bit map data are transmitted to the terminal by a bit map encoder. The terminal reads out bit map codes stored in the user region of the motion picture codes and reproduces the bit map date in a bit map decoder. An optimum encoding can be carried out and a code size can be further compressed.

3 Claims, 21 Drawing Sheets

MOTION PICTURE REPRODUCING SYSTEM BY BIDIRECTIONAL COMMUNICATION

BACKGROUND OF THE INVENTION

The present invention relates to a motion picture reproducing system for transmitting video information to terminals from a video server in response to requests of the terminals by bidirectional communication.

Conventionally, when an image is digitalized and is transmitted from a communication line, the amount of data becomes enormous and hence the image is usually compression-encoded by a compression-encoding system such as JPEG (Joint Photographic Experts Group) or MPEG (Moving Picture Experts Group). As its general application examples. TV conference, CATV (Cable TV). VOD (Video On Demand) are known.

Reproduction of image information by conventional bidirectional communication will be described with reference to the drawings. FIG. 1 illustrates a conventional motion picture reproducing system for transmitting a video required from a terminal from a video server to the terminal. In FIG. 1, each terminal includes a terminal controller 101, a keyboard 102, a communication unit 103, a memory 104, a decoder 105 and a display 106, and a video server includes a server controller 107, a communication unit 108, a memory 109 and motion picture code file 110. The terminal controller 101 and the server controller 107 allow the two communication units 103 and 108 to carry out mutual bidirectional communication. That is, a user selects the desired video by the keyboard 102 on the terminal side to request the video to the video server. In response to this request from the terminal, the video server searches the motion picture code file 110 for the requested video, reads the selected motion picture code file and transmits the selected file to the terminal. Then, the terminal receives the selected motion picture code file, expands the received file in the decoder 105 and displays the requested video on the display 106.

FIG. 2 shows one example of a screen display in a video selection operation. As shown in FIG. 2, on the first screen 111, a start screen of a video service is displayed to wait for the user to select one of a video service, a TV service and a game service. When the user selects the video service, genres are displayed on the second screen 112 to wait for the user to select one genre. Next, when the user selects one genre, titles of videos in the selected genre are displayed on the third screen 113 to wait for the user to select the title of one video and to push a play button. The reproduction of the selected video is displayed on the fourth screen 114.

Usually, these images are compressed by cutting off high frequency components in an image compression system such as the JPEG or the MPEG based on DCT (discrete cosine transform). Accordingly, in an image showing many characters or graphics having many high frequency components, the screen gets blurred.

In order to solve this problem, for example, an image encoder has been developed, as disclosed in Japanese Patent Laid-Open No. Hei 5-300495. In this apparatus, the image is separated into motion image components and still image components and an optimum encoding is independently performed on the separated components. However, in this case, the still image components extending over a plurality of frames are also encoded and the compression rate turns out low.

On the other hand, in a conventional data management method, as disclosed in Japanese Patent Laid-Open No. Hei 4-245789, a data table in which information of motion images, sounds, numerals, character strings, still pictures and graphics is structured with respect to time base is prepared, thereby managing a plurality of media. However, in this method, data are separated from the data table and hence for transmission, the construction becomes complicated.

Further, as another conventional system, an information record reproduction system has been proposed, as disclosed in Japanese Patent Laid-Open No. Hei 1-273269. In this system, a plurality of codes are separated by identifier codes and further a region of a storage medium is also separated for encoding. However, in this system, in communication incapable of conducting a random access, information cannot be transmitted.

SUMMARY OF THE INVENTION

It is therefore an object of the present invention to provide a motion picture reproducing system in view of the aforementioned disadvantages of the prior art, which is capable of encoding characters and graphics separately by a simple construction using bidirectional communication to reproduce high quality images, carrying out an optimum encoding, and further compressing a code size.

In accordance with one aspect of the present invention, there is provided a motion picture reproducing system transmitting a desired video from a video server to at least one terminal in response to a request of the terminal by bidirectional communication, the video server comprising: first transmission means for transmitting motion picture codes to the terminal, first transmission means containing codes of data representing RGB values of dots of characters, graphics and a rectangle region in a user region of the motion picture codes, the data being hereinafter referred to as a bit map; discrimination means for discriminating whether or not data of the character and graphic are registered in the terminal: and second transmission means for transmitting bit map data to the terminal in the case of the data of the character and graphic which are not registered in the terminal.

The terminal includes means for reproducing the characters, the graphics and the codes of the bit map stored in the user region of the motion picture codes.

Further, preferably the video server further includes means for registering the characters, the graphics and the codes of the bit map which are frequently used, to the terminal, and the terminal further includes means for registering the characters, the graphics and the codes of the bit map which are frequently used.

According to the present invention, the characters and the graphics are encoded separately and hence high quality images can be reproduced. Moreover, by registering the codes of the characters and the graphics used frequently, a code size can be further compressed.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENT

The present invention will now be described in connection with its preferred embodiment with reference to the accompanying drawings.

Figure 3:
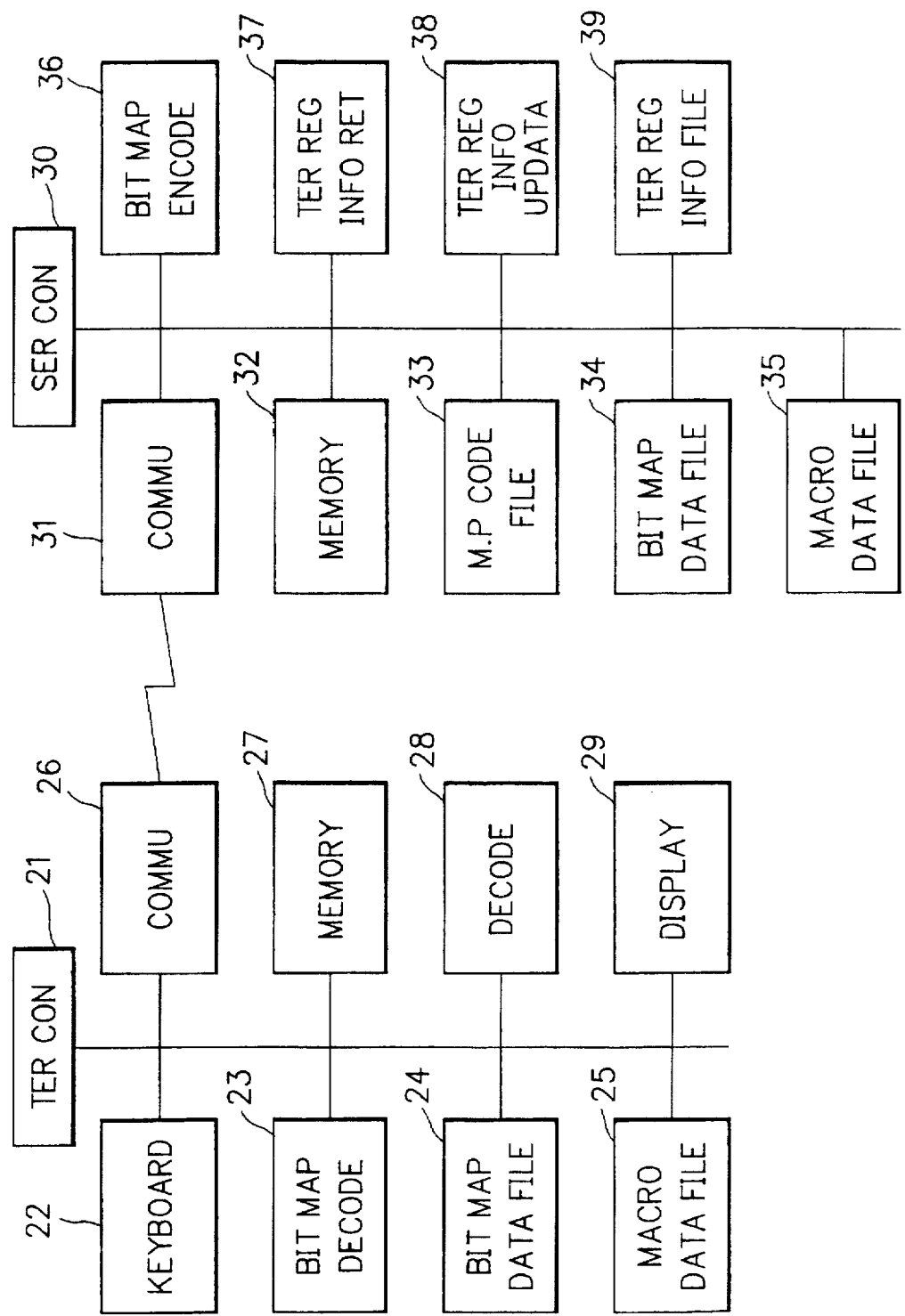
FIG. 3 is a block diagram of a motion picture reproducing system according to one embodiment of the present system.

FIG. 3 illustrates one embodiment of a motion picture reproducing system for transmitting video information from a video server to terminals in response to requests of the terminals by bidirectional communication according to the present invention. In FIG. 3, the motion picture reproducing system comprises a terminal and a video server. The terminal includes a terminal controller 21 for controlling the whole system of the terminal, a keyboard 22 for inputting a user's selection, a bit map decoder 23 for reconstituting bit map codes of characters and graphics, a bit map data file 24 for storing RGB (Red, Green, Blue) data of dots of the bit map codes, a macro data file 25 for storing codes of many characters and graphics to be used, a communication unit 26 for communicating with the video server, a memory 27 for storing contents of variables during execution and motion picture codes, a decoder 28 for expanding the motion picture codes, and a display 29 for displaying images.

On the other hand, the video server includes a server controller 30 for controlling the whole video server system, a communication unit 31 for communication with the terminal, a memory 32 for storing contents of variables during execution and motion picture codes, a motion picture code file 33 as video information, a bit map data file 34 for storing RGB data of dots of the bit map codes, a macro data file 35 for storing many characters and graphics to be used many time every terminal, a bit map encoder 36 for encoding bit map data such as characters and graphics, a terminal registration information retrieval means 37 for checking up whether or not the bit map data of the characters and graphics and the macro data are registered in the terminal, a terminal registration information update means 38 for updating the terminal registration information, and a terminal registration information file 39 for storing the terminal registration information.

The terminal and the video server allow the two communication units 26 and 31 to perform bidirectional communication. When the terminal requests a video, the video server selects the motion picture codes of the requested video from the motion picture code file 33 and transmits the codes to the terminal. At that time, the terminal registration information file 39 is verified to check whether or not the bit map data of the characters and graphics stored in the user region of the motion picture codes are registered. When the data are not registered in the terminal, the bit map encoder 36 transmits the bit map data to the terminal. Further, the bit map data of the characters and graphics used many times as the macro data are stored in the macro data file 35, and the terminal registration information update means 38 updates the terminal registration information file 39 and transmits the updated file 39 to the terminal. The terminal reads the bit map codes out of the user region of the motion picture codes and reconstitutes codes on reference to the bit map data file 24 and the macro data file 25 in the bit map decoder 23. In addition, the bit map data transmitted from the video server as the macro data are stored in the macro data file 25.

Figure 4:
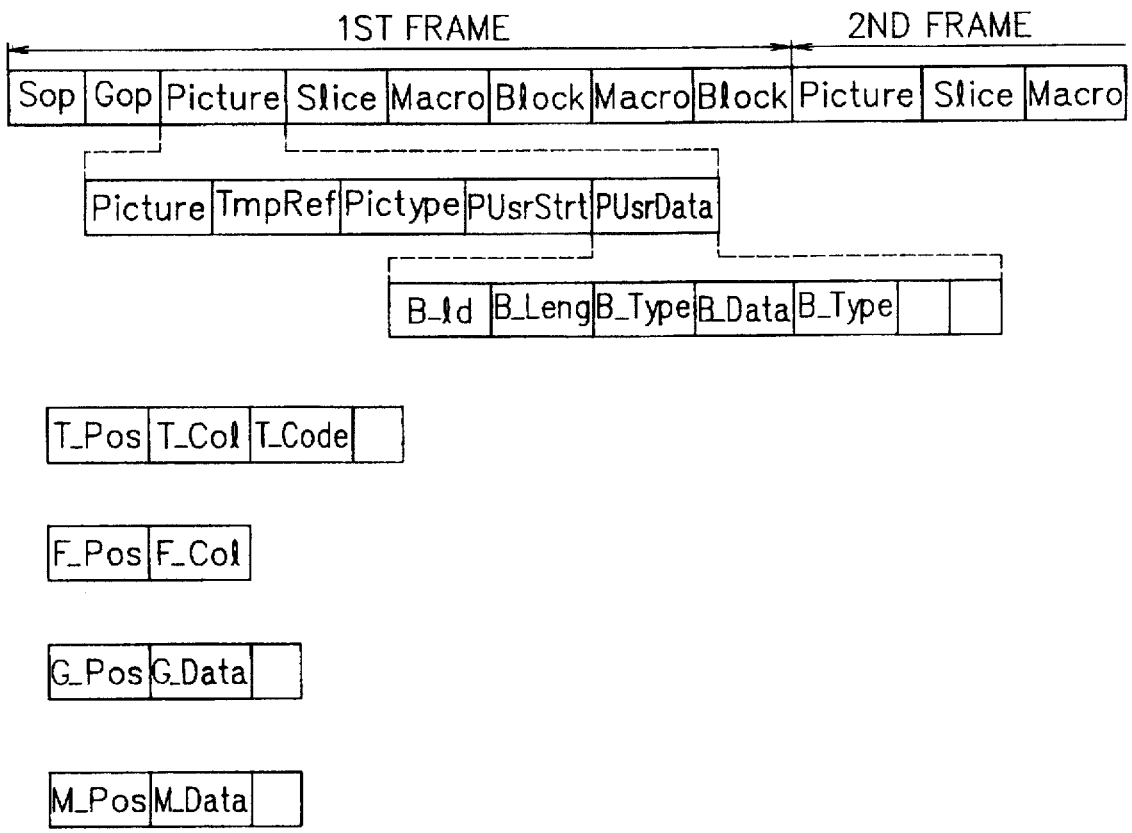
FIG. 4 is a schematic view showing a configuration of motion picture codes used in the present invention.

FIG. 4 shows a configuration of motion picture codes in the case using the MPEG. In FIG. 4, the motion picture codes include:

(1) Seq: sequence header, (2) GOP: GOP (Group Of Picture) header, (3) Picture: picture header, (4) Slice: slice header, (5) Macro: macro block header, and (6) Block: block.

The picture header includes:

(7) PicStart: start code of the picture header, (8) TmpRef: number showing display order of the picture, (9) PicType: code showing kind of I. P. B,

(10) PUsrStrt: code showing the presence of user data of the picture header, and

(11) PUsrData: the user data of the picture header.

The bit map codes are stored in the user data region and include:

(12) B_Id: identifier "bit" showing the bit map codes,

(13) B_leng: (frame number) period showing the bit map,

(14) B_type: type flags of the bit map codes, for example.

① characters: Gothic type: 0101H, and Ming type: 0102H,
② graphics: rectangle: 0201H, and circle: 0202H,
③ bit map: 0300H, and
④ macro data: 0400H, and

(15) B_Data: codes showing the bit map or the bit map data, for example,

① characters: T_Pos (display position), T_Col (display color), and T_Code (character code), ② graphics: F_Pos (display position: coordinates of 4 points in the case of rectangle, and coordinates of the center and a length of radius in the case of circle) and F_Col (color of painting).

③ bit map: G_Pos (display position) and G_Data (RGB data string of each position), and ④ macro data: M_Pos (display position) and M_Data (macro number).

Figure 5:
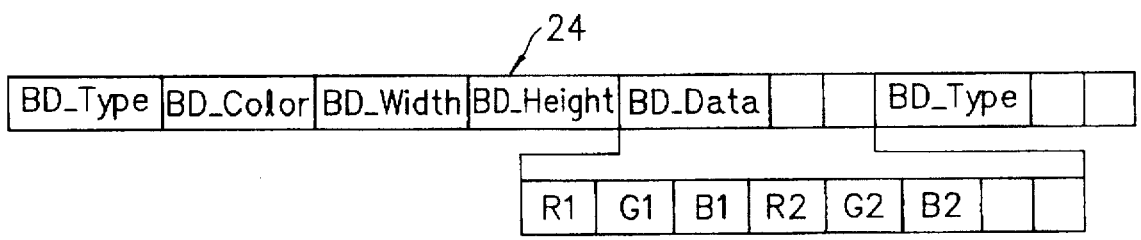
FIG. 5 is a schematic view showing a configuration of a bit map data file used in the present system.

FIG. 5 illustrates a configuration of one example of the bit map data file 24. This bit map data file includes:

(1) BD_Type: type flags of the bit map codes, for example,
① characters: Gothic type: 0101H, and Ming type: 0102H,
② graphics: rectangle: 0201H, and circle: 0202H, (2) BD_Color: codes showing colors.

(3) Codes showing contents of the bit map, for example,
① character codes in the case of characters,
② horizontal size and vertical size in the case of rectangle, and
③ length of radius in the case of circle, (4) BD_Width: horizontal size of the bit map data, (5) BD_Height: vertical size of the bit map data, and (6) BD_Date: the bit map data (RGB data of each dot)
Ri (i=0–n): value of red of the i-th dot (0–255),
Gi (i=0–n): value of green of the i-th dot (0–255), and
Bi (i=0–n): value of blue of the i-th dot (0–255).

By referring to the bit map data file 24 shown in FIG. 5, the terminal can decodes the bit map codes stored in the user region of the motion picture codes into the corresponding bit map data in the bit map data bile 24.

Figure 1:
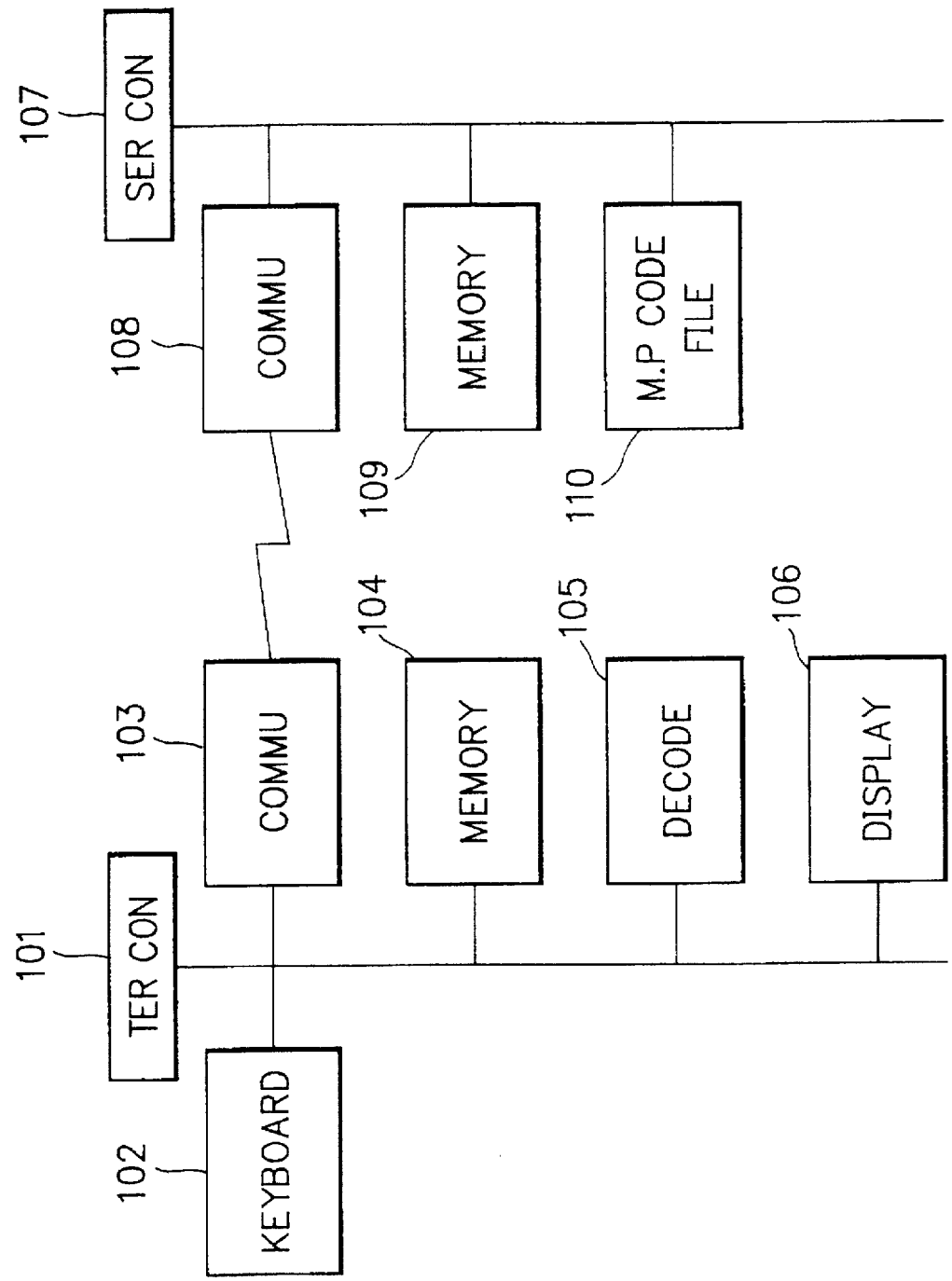
FIG. 1 is a block diagram of a conventional motion picture reproducing system.
Figure 2:
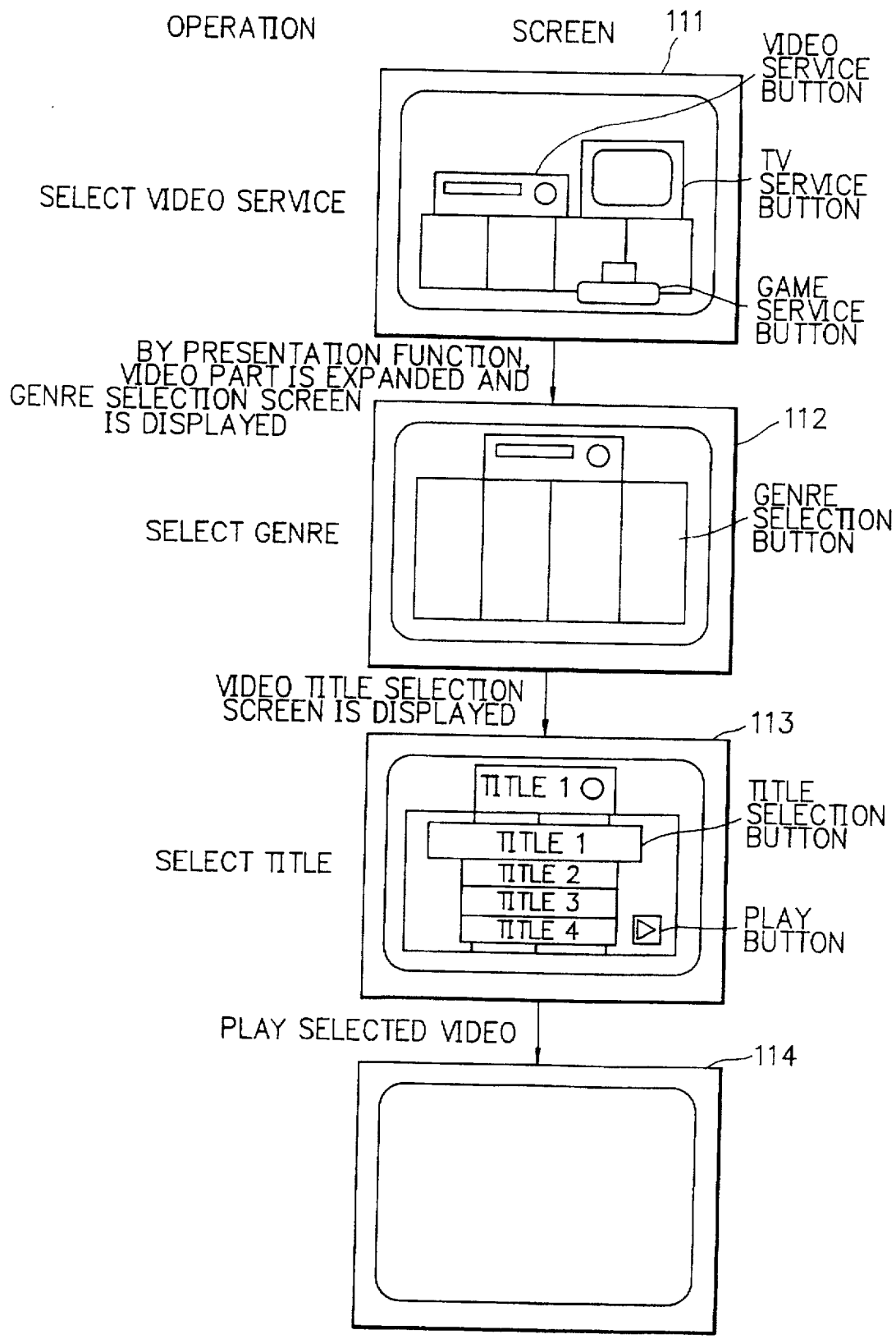
FIG. 2 is a schematic view showing a conventional video selection operation.
Figure 6:
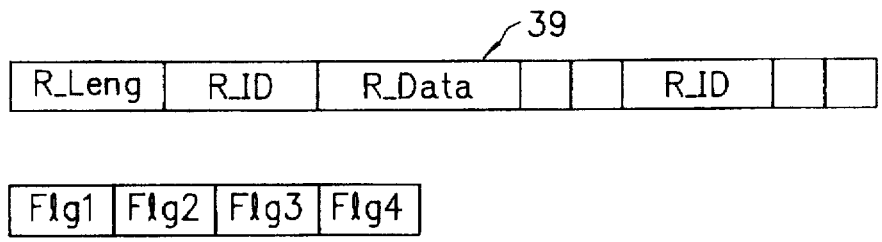
FIG. 6 is a schematic view showing a configuration of a terminal registration information file used in the present system.

FIG. 6 shows a configuration of one example of the terminal registration information file 39. For each terminal, the terminal registration information file 39 includes:

(1) R_leng: number of terminal registration information, (2) R_ID: type flags of registration information, e.g.,
① characters/graphics: 01H, and
② macro data: 02H, and (3) R_Data: data of registration information, e.g.,
① in the case of characters/graphics:
FIG 1: 1 when the Gothic type is registered.
FIG 2: 1 when Ming type is registered,
FIG 3: 1 when rectangle is registered, and
FIG 4: 1 when circle is registered, and
② in the case of macro data:
Number of macro data registered in the terminal.

By referring to the terminal registration file 39, the video server inspects whether or not the macro data of the bit map codes are registered in the terminal, and, when the data are registered in the terminal, the video server transmits its macro number to the terminal. Further, the video server checks whether or not the terminal can reconstitute the bit map codes, and, when the terminal cannot reconstitute, the video server changes the bit map codes to the bit map data and transmits the bit map data to the terminal.

Figure 7:
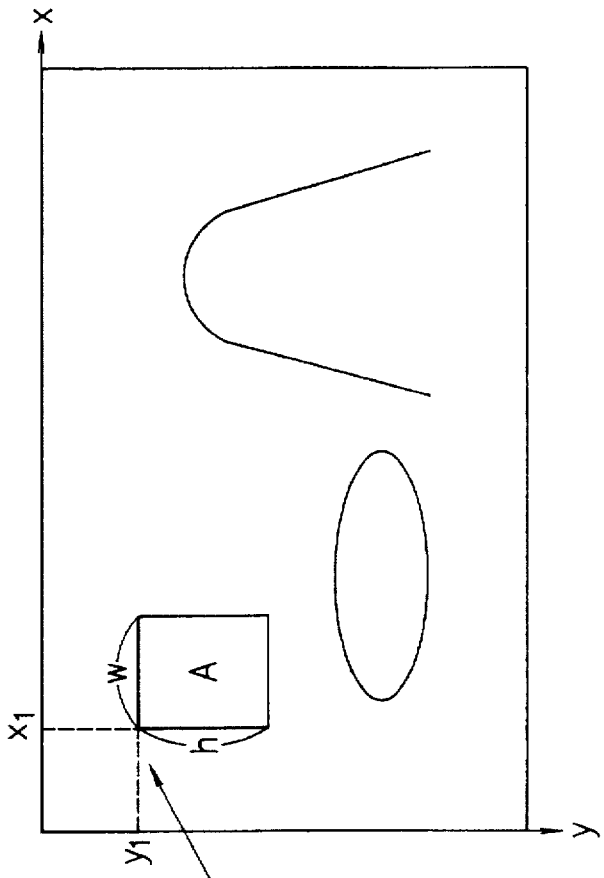
FIG. 7 is a schematic view showing a synthesis of a bit map and an image in the present system.

FIG. 7 depicts one example of a synthesis of bit map data and an image. As shown in FIG. 7, the bit map data and the image are shown as the RGB values of the dots of a rectangle region. In the example shown in FIG. 7, the RGB data of the bit map with a horizontal size w and a vertical size h are overwritten on the RGB data of the image so that the upper left end point may be $(x_1, y_1)$, and this region is replaced with the bit map and is displayed.

Figure 8:
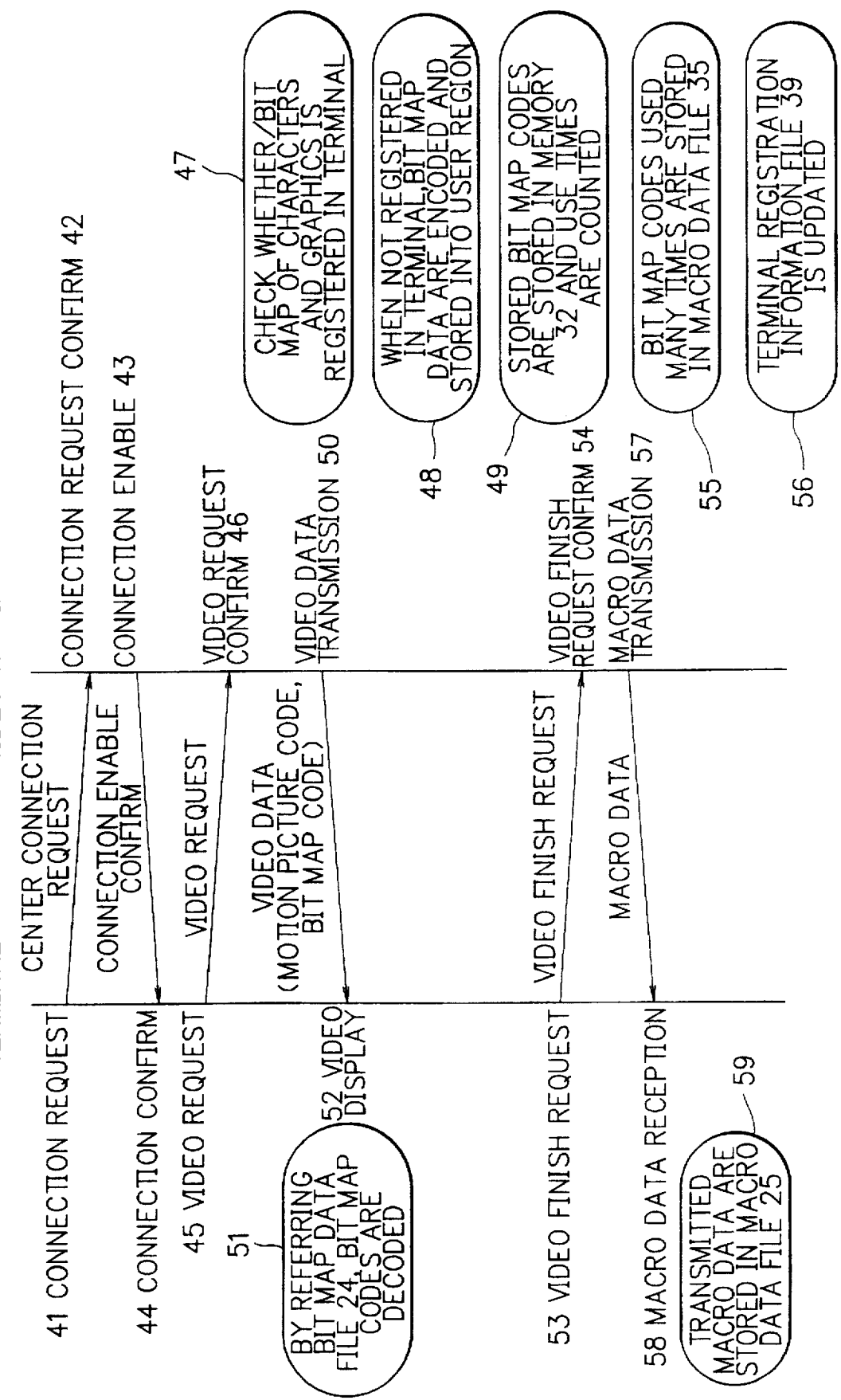
FIG. 8 is a sequential diagram between a terminal and a video server in the present system.

FIG. 8 illustrates an operational sequence between the terminal and the video server. In FIG. 8, when the terminal gives a connection request (41) to the video server, the video server receives the connection request (42) and transmits a connection enable (43) to the terminal, and thus the terminal confirms the connection (44). Next, when the terminal transmits a video request (45) to the video server, the video server confirms the video request (46). Then, the video server checks whether or not the bit map data of the characters and graphics are registered in the terminal (47), and, when the data are not registered in the terminal, the video server encodes the bit map data into the bit map (48), stores the used bit map codes in the memory 32 to count the used times (49), and transmits the motion picture codes of the video to the terminal (50). The terminal decodes the bit map codes by reference to the bit map data file 24 (51) and display the video (52). Next, when the terminal gives a video finish request (53) to the video server, the video server confirms the video finish request (54), stores the bit map codes used many times into the macro data file 35 (55), renews the terminal registration information file 39 (56), and transmits the macro data to the terminal (57). The terminal receives the macro data (58) and stores the received macro data into the macro data file 25 (59).

As described above, by using the bit map data file in both the terminal and the video server, the encoding and decoding of the bit map data can be carried out. Further, the frequently used bit map codes transmitted to the terminal are stored as the macro data and hence the compression of the bit map codes can be performed.

Figure 9:
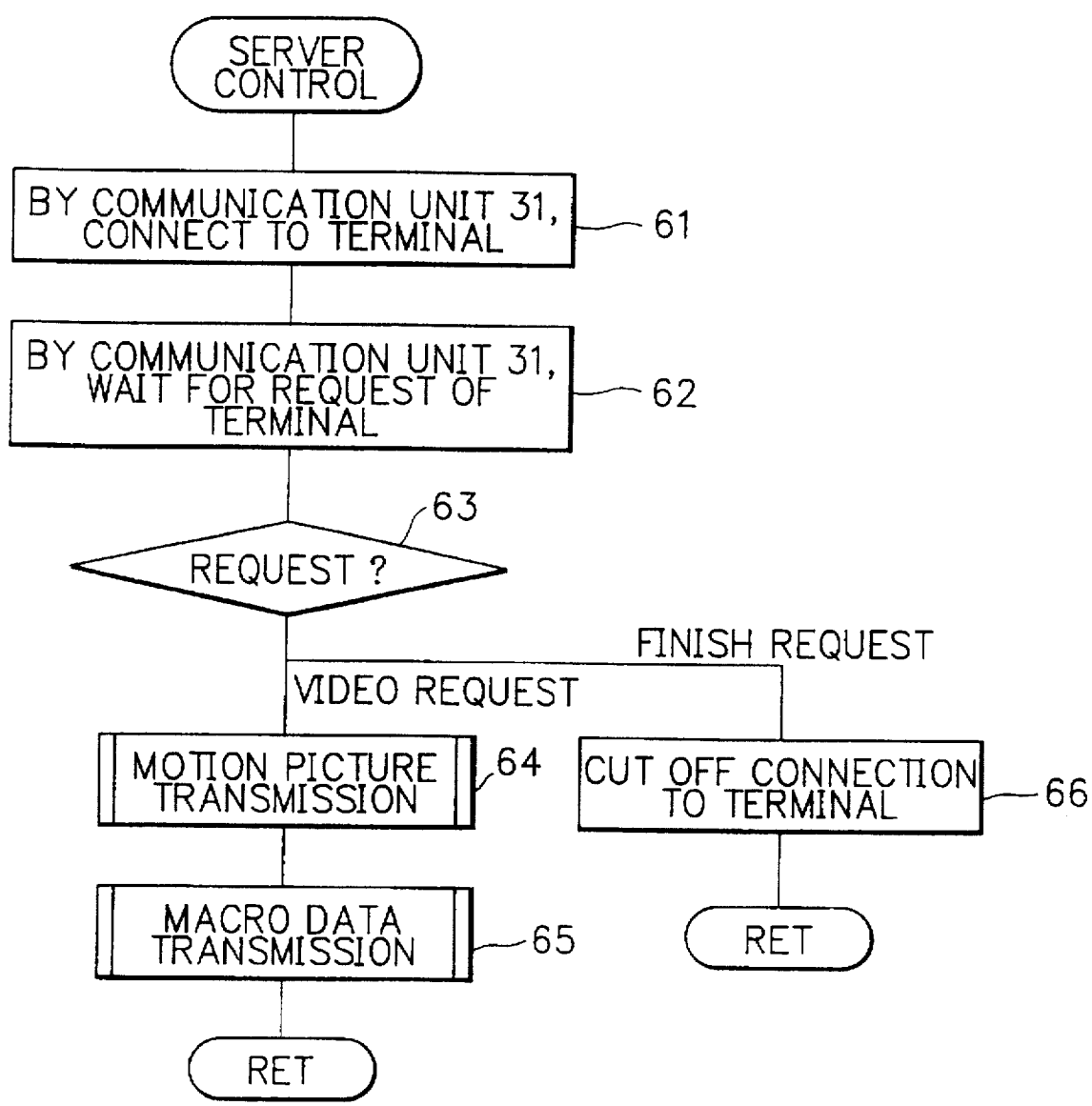
FIG. 9 is a flow chart of a video server control in the present system.

Next, with the foregoing construction, a reproduction of a video will now be described. FIG. 9 is a flow chart showing an operation of the server controller 30 for controlling the whole video server. The server controller 30 allows the video server to connect to the terminal by the communication unit 31 (step 61) and waits for the terminal to give a request (step 62). Next, the server controller 30 discriminates whether or not the terminal gives the request (step 63), and, when the terminal gives a video request, the server controller 30 executes a motion picture transmission (step 64) and then a macro data transmission (step 65). On the other hand, when the terminal gives a finish request, the server controller 30 cuts off the connection to the terminal (step 66).

Figure 10:
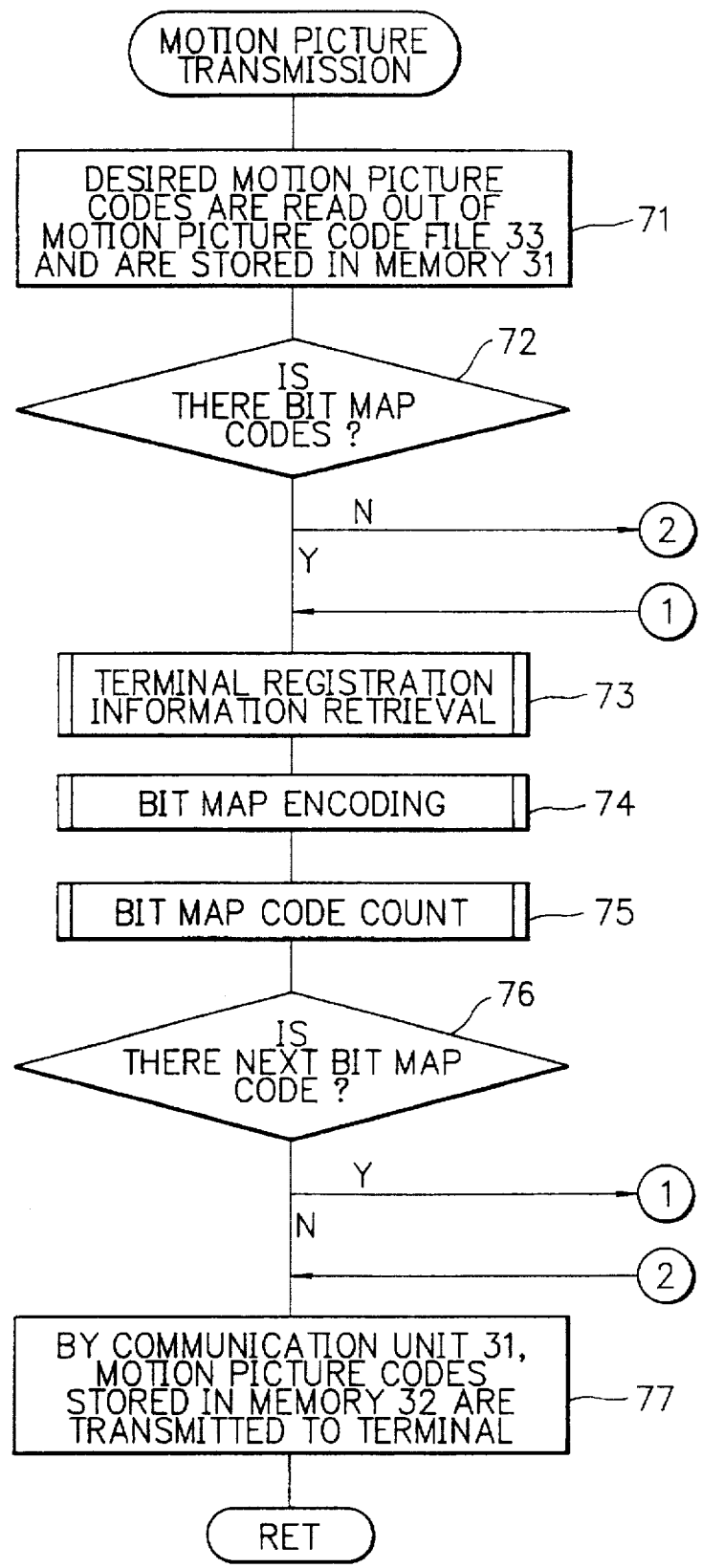
FIG. 10 is a flow chart of a motion picture transmission in the present system.

FIG. 10 is a flow chart of a motion picture transmission. On a motion picture transmission, the video server reads the desired motion picture codes out of the motion picture file 33 and then stores the codes into the memory 32 (step 71). Next, it is discriminated whether or not there are bit map codes in the header (step 72), and, when there is no bit map code in the header, move to step 77. When there are bit map codes in the header, the video server carries out a terminal registration information retrieval (step 73), encodes the bit map (step 74), and counts the bit map codes (step 75). Next, it is discriminated whether or not there is a next bit map code (step 76), and, when there is the next bit map code, return to step 73. When there is no next bit map code, the motion picture codes stored in the memory 32 are transmitted to the terminal by the communication unit 31 (step 77).

Figure 11:
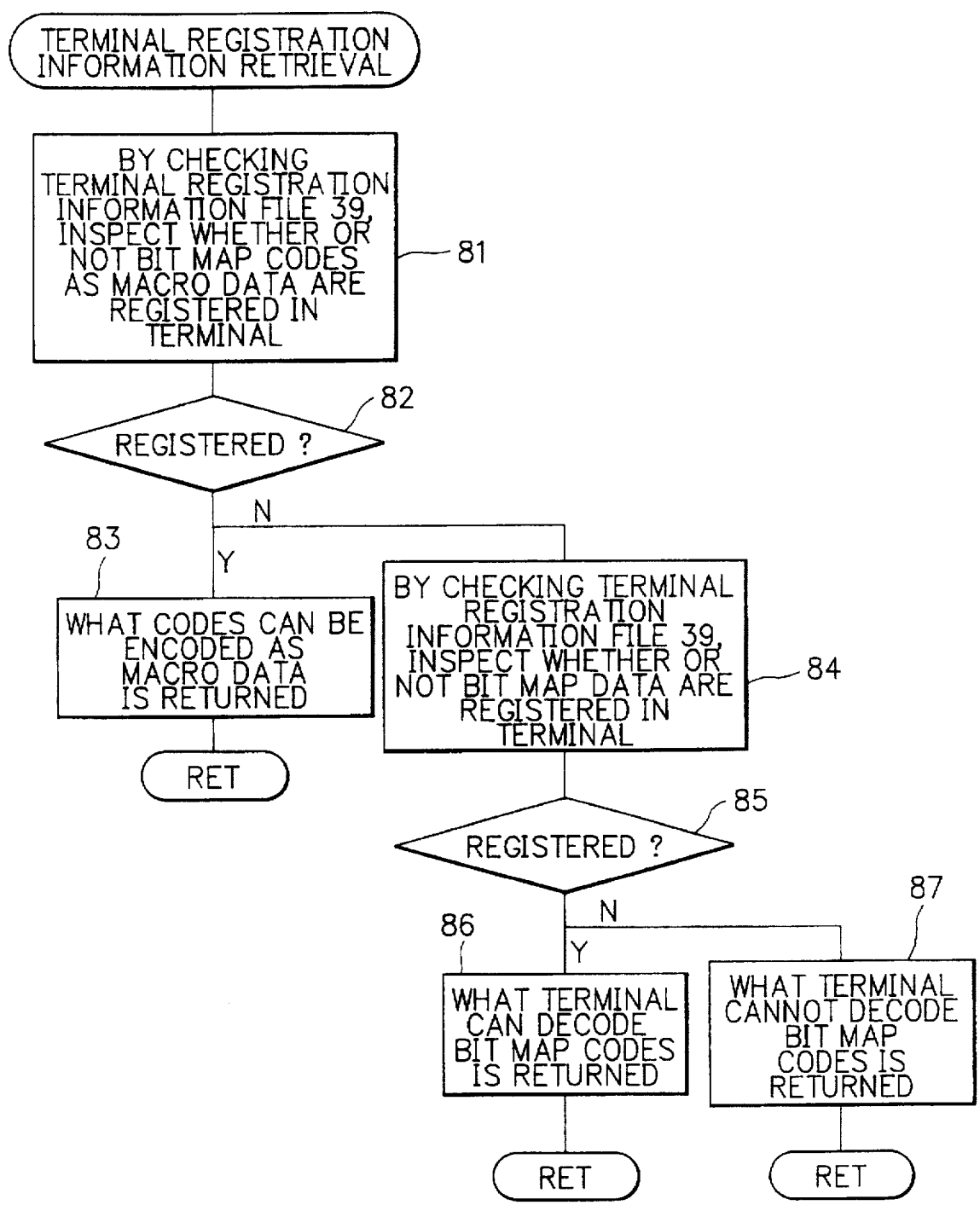
FIG. 11 is a flow chart of a terminal registration information retrieval in the present system.

FIG. 11 is a flow chart of a terminal registration information retrieval. For the terminal registration information retrieval, first, by checking the terminal registration information file 39, it is inspected whether or not the bit map codes as the macro data are registered in the terminal (step 81) and it is discriminated whether or not the bit map codes are registered in the terminal (step 82). When the bit map codes are registered in the terminal, what the bit map codes can be encoded as the macro data is returned in step 83. On the other hand, when no bit map code is registered in the terminal, by checking the terminal registration information file 39, it is inspected whether or not the bit map data are registered in the terminal (step 84) and it is discriminated whether or not the bit map data are registered in the terminal (step 85). When the bit map data are registered in the terminal, what the terminal can decode the bit map codes is returned (step 86). When no bit map data are registered in the terminal, what the terminal cannot decode the bit map codes is returned (step 87).

Figure 12:
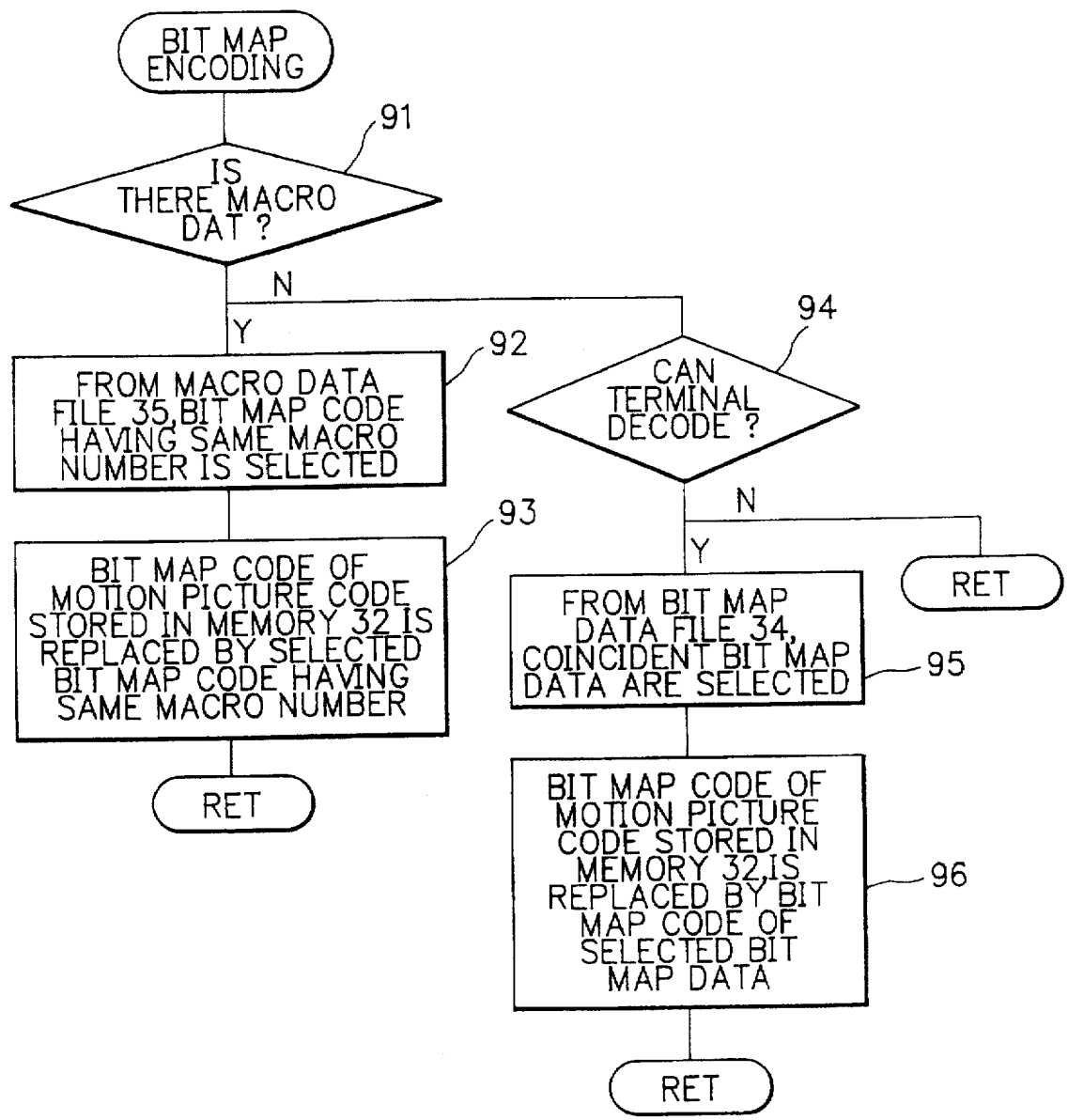
FIG. 12 is a flow chart of a bit map encoding in the present system.

FIG. 12 is a flow chart of a bit map encoding. The bit map encoding is executed as follows. First, it is discriminated whether or not there are the macro data in the terminal (step 91), and, when there are the macro data in the terminal, the bit map code having the same macro number is selected from the macro data file 35 (step 92) and the bit map code of the motion picture code stored in the memory 32 is replaced by the selected bit map code having the same macro number (step 93). When there is no macro data in the terminal, it is discriminated whether or not the terminal can decode the bit map code (step 94), and, when the terminal can decode the bit map code, this processing is ended. On the other hand, when the terminal cannot decode the bit map code, the coincident bit map data are selected from the bit map data file 34 (step 95) and the bit map code of the motion picture code stored in the memory 32 is replaced by the bit map code of the selected bit map data (step 96).

In this way, by referring to the terminal registration information file 39, the bit map data file 34 and the macro data file 35, the video server can transmit the suitable bit map code to each terminal.

Figure 13:
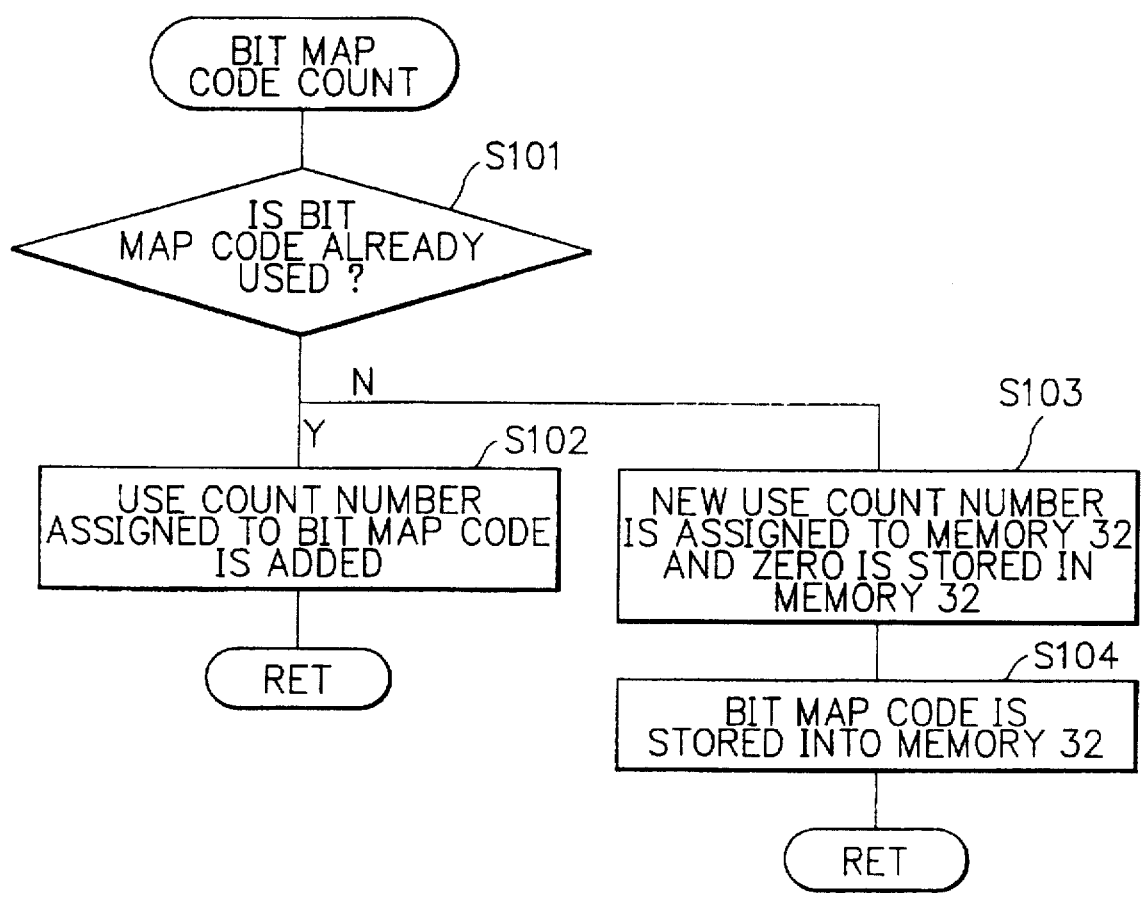
FIG. 13 is a flow chart of a bit map code counting in the present system.

FIG. 13 is a flow chart of a bit map code count. For the bit map code count, first, it is discriminated whether or not the bit map code is already used (step S101), and, when the bit map code is already used, the use count number assigned to the used bit map code is added (step 8102). On the other hand, when the bit map code is not used, a new use count number is assigned to the memory 32 and zero is stored therein (step S103). And the bit map code is stored into the memory 32 (step 3104).

Figure 14:
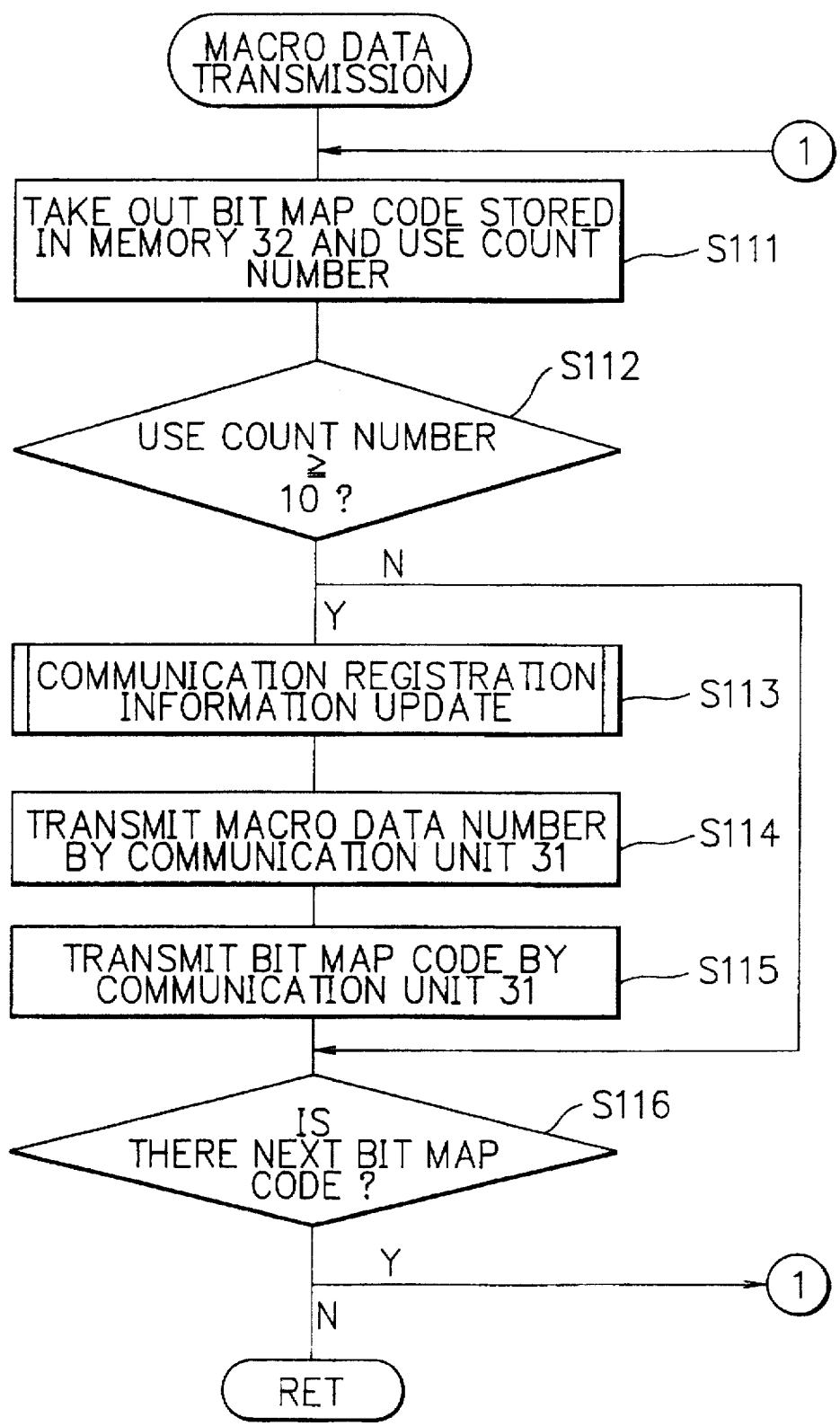
FIG. 14 is a flow chart of a microdata transmission in the present system.

FIG. 14 is a flow chart of a macro data transmission. For the macro data transmission, first, the bit map code stored in the memory 32 and the use count number are taken out (step S111), and it is discriminated whether or not the use count number is equal to 10 or more (step S112). When the use count number is not equal to 10 nor more, move to step 8116. On the other hand, when the use count number is equal to 10 or more, the terminal registration information update is carried out (step S113), transmits a new macro data number from the communication unit 31 to the terminal (step S114), and transmits the bit map code from the communication unit 31 to the terminal(step S115). Next, it is discriminated whether or not there is a next bit map code (step S116), and, when there is a next bit map code, return to step S111. When there is no next bit map code, the processing is ended.

As described above, by registering the bit map codes used many times as the macro data in both the terminal and the video server, the macro data can be used. In this case, although in the case of at least 10 used times the bit map codes as the macro data are registered, any of at least two used times may be registered according to the present invention.

Figure 15:
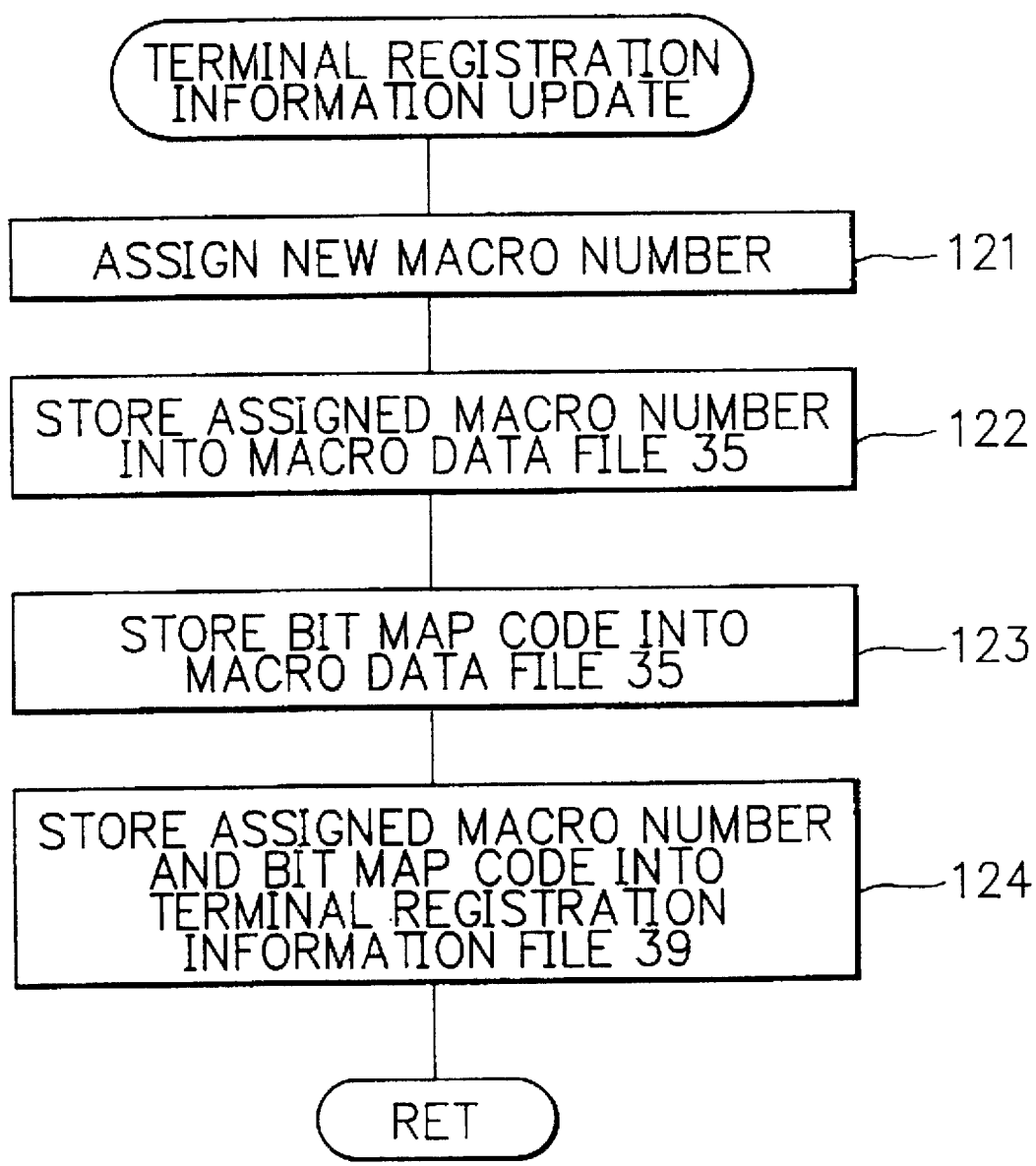
FIG. 15 is a flow chart of a terminal registration information update in the present system.

FIG. 15 is a flow chart of a terminal registration information update. For the terminal registration information update, first, a new macro number is assigned (step 121), and the assigned macro number is stored in the macro data file 35 (step 122). And the bit map code is stored in the macro data file 35 (step 123), and the assigned macro number and the bit map code are stored in the terminal registration information file 39 (step 124).

Figure 16:
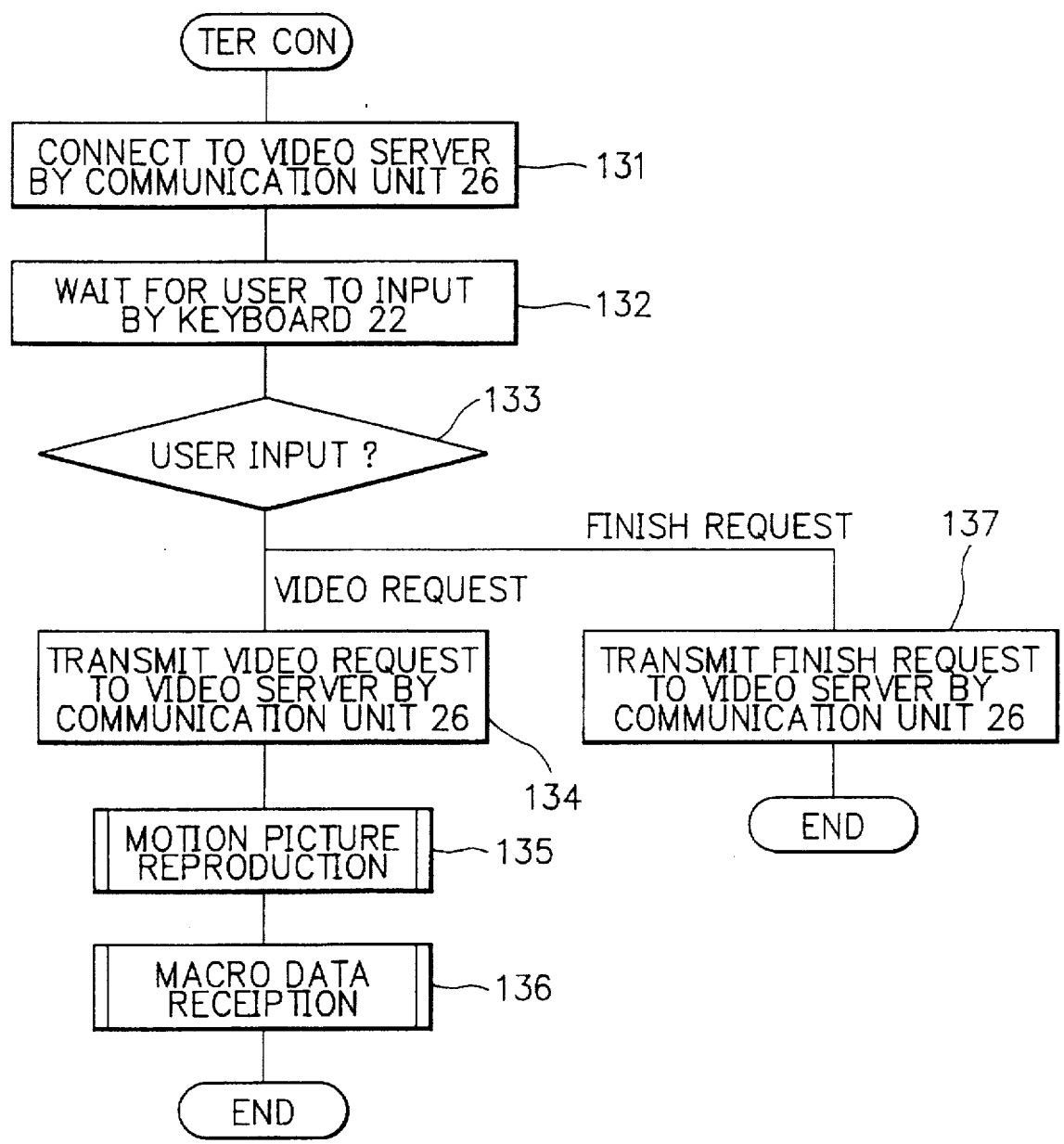
FIG. 16 is a flow chart of a terminal control operation in the present system.

Next, the processing of the terminal will be described. FIG. 16 is a flow chart showing an operation of the terminal controller 21 for controlling the whole terminal. For the terminal control, first, the terminal controller connects to the video server by the communication unit 26 (step 131) and waits for the user to input by the keyboard 22 (step 132). Next, it is discriminated whether or not there is a user's input (step 133). When there is a video request, the terminal controller 21 allows the communication unit 26 to transmit the video request to the video server (step 134), conducts the motion picture reproduction (step 135), and carries out a macro data reception (step 136). On the other hand, when there is a finish request, the finish request is transmitted to the video server by the communication unit 26 (step 137).

Figure 17:
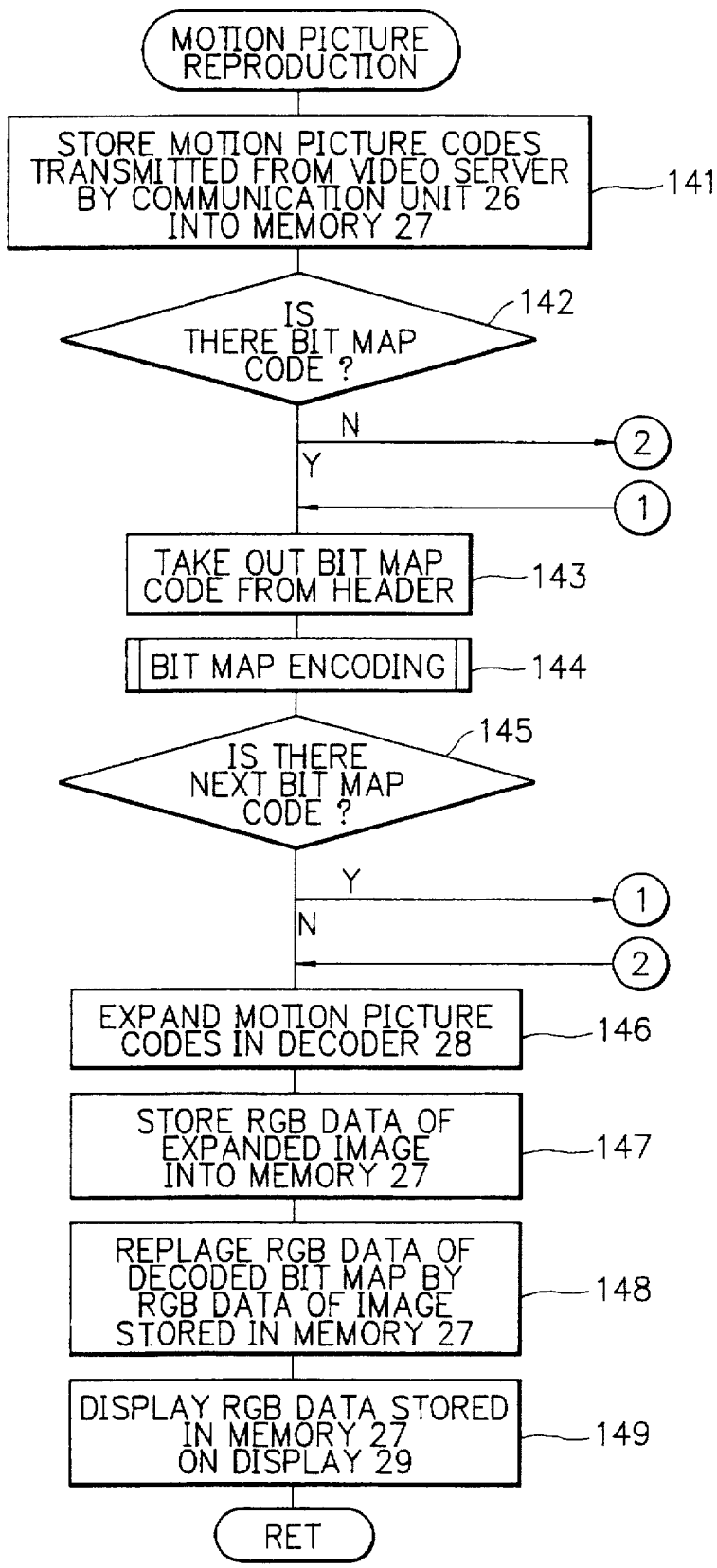
FIG. 17 is a flow chart of a motion picture reproduction in the present system.

FIG. 17 is a flow chart of a motion picture reproduction. For the motion picture reproduction, first, the motion picture codes transmitted from the video server to the communication unit 26 are stored in the memory 27 (step 141), and it is discriminated whether or not there is a bit map code on the header (step 142). When there is no bit map code on the header, move to step 146. On the other hand, when there is a bit map code on the header, the header is read and the bit map code is taken out (step 143). The bit map decoding is executed (step 144), and it is discriminated whether or not there is a next bit map code (step 145). When there is a next bit map code, return to step 143. On the other hand, when there is no next bit map code, the motion picture codes are expanded by the decoder 28 (step 146), and the RGB data of the expanded image are stored in the memory 27 (step 147) and are decoded. Then, the RGB data of the bit map are replaced with the RGB data of the image stored in the memory 27 (step 148), and the RGB data stored in the memory 27 are displayed on the display 29 (step 149).

Figure 18:
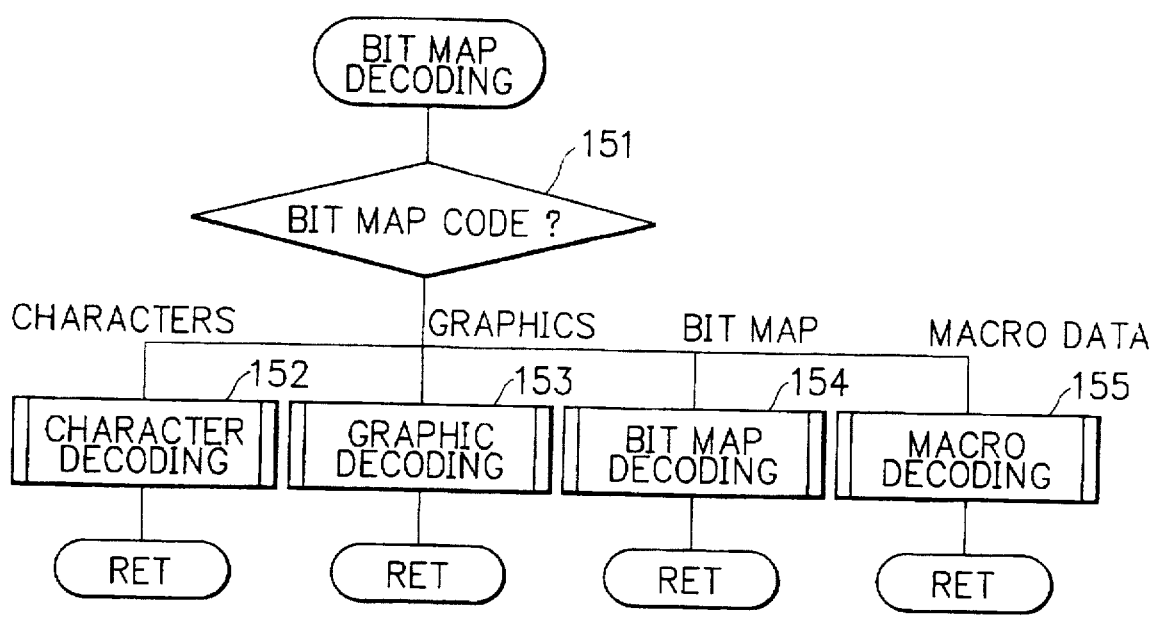
FIG. 18 is a flow chart of a bit map decoding in the present system.

FIG. 18 is a flow chart of a bit map decoding. For the bit map decoding, first, the kind of the bit map codes is discriminated (step 151). When the bit map codes are characters, a character decoding is performed (step 152). When the bit map codes are graphics, a graphic decoding is conducted (step 153). Further, when the bit map codes are a bit map, a bit map decoding is carried out (step 154). When the bit map codes are macro data, a macro decoding is executed (step 155).

Figure 19:
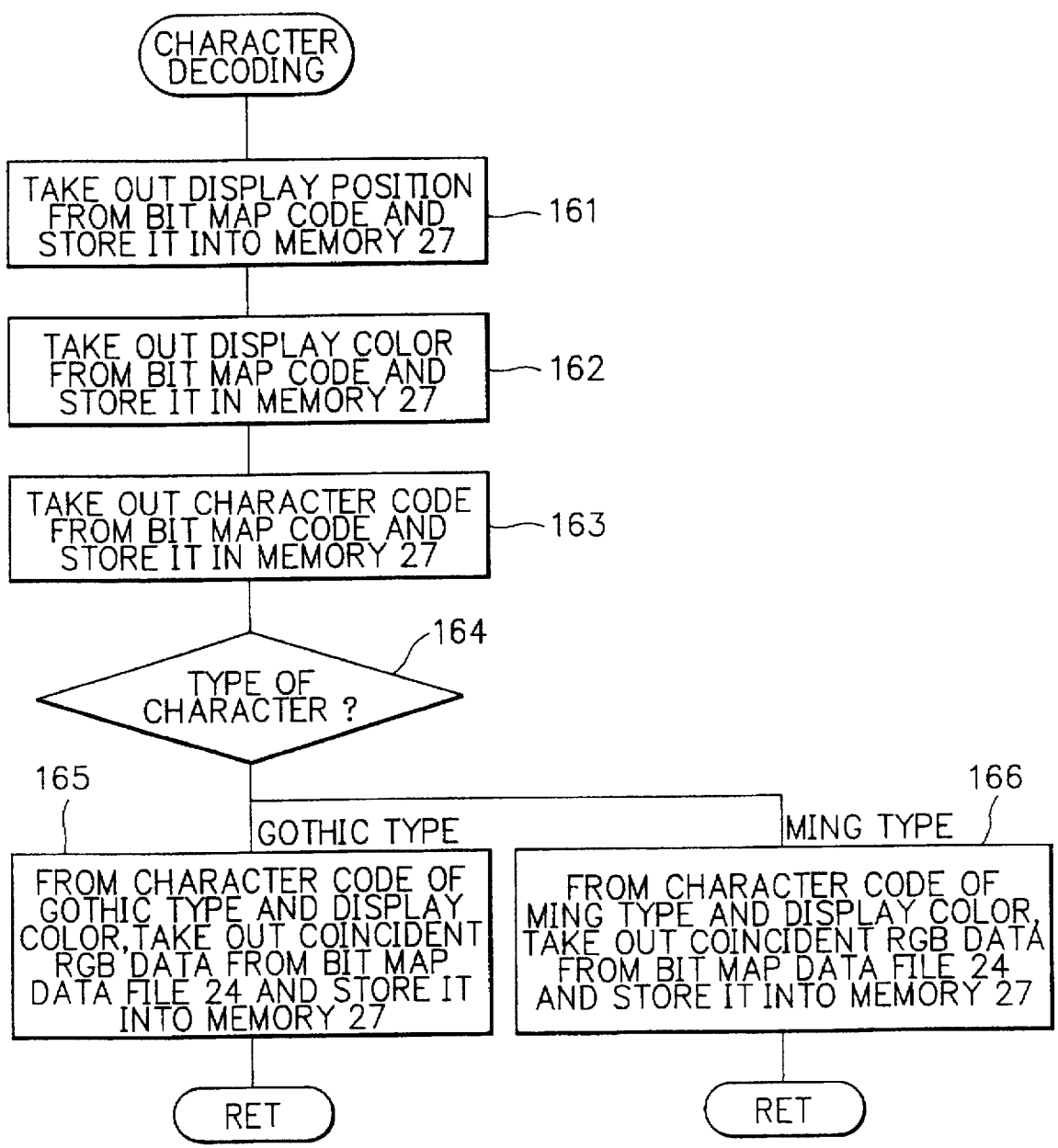
FIG. 19 is a flow chart of a character decoding in the present system.

FIG. 19 is a flow chart of a character decoding. For the character decoding, first, a display position is taken out from a bit map code to store into the memory 27 (step 161), a display color is taken out from the bit map code to store into the memory 27 (step 162), and a character code is taken out from the bit map code to store into the memory 27 (step 163. Next, a type of a character is discriminated (step 164), and, when the character is the Gothic type, from a character code of the Gothic type and the display color, coincident RGB data are taken out from the bit map data file 24 to store into the memory 27 (step 165). On the other hand, when the character is the Ming type, from a character code of the Ming type and the display color, coincident RGB data are taken out from the bit map data file 24 to store into the memory 27 (step 166).

In this embodiment, although the Gothic type and the Ming type are used, other character types such as the Italic type and the bald type may be used.

Figure 20:
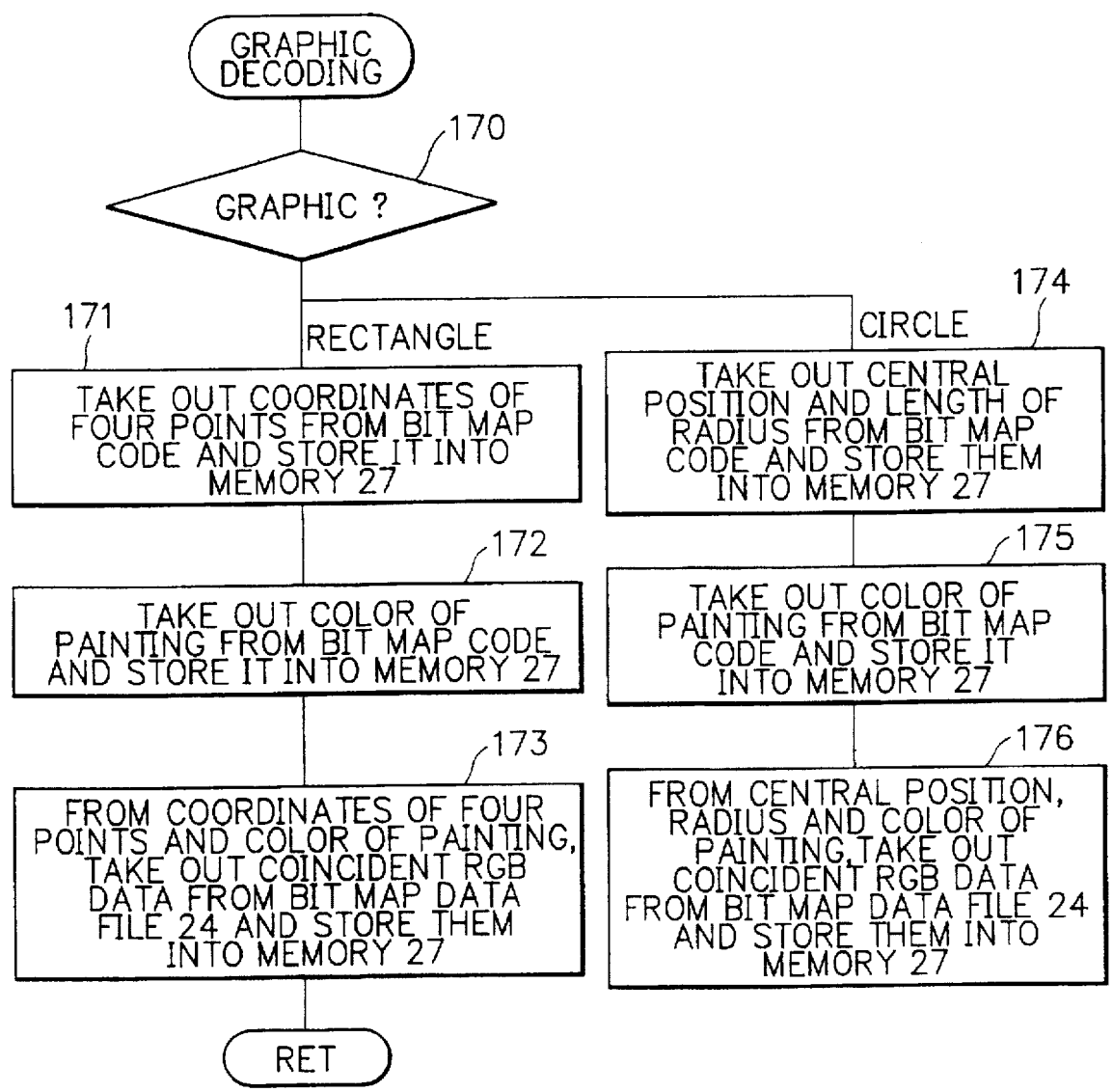
FIG. 20 is a flow chart of a graphics decoding in the present invention.

FIG. 20 is a flow chart of a graphic decoding. For the graphic decoding, first, a kind of a graphic is discriminated (step 170). When the graphic is a rectangle, from the bit map codes, coordinates of four points are taken out to store into the memory 27 (step 171) and further from the bit map codes a color of painting is taken out to store into the memory 27 (step 172). And from the coordinates of the four points and the color of painting, coincident RGB data are taken out from the bit map data file 24 to store ito the memory 27 (step 173).

On the other hand, when the graphic is a circle, from the bit map codes, a central position and a radius are taken out to store into the memory 27 (step 174), and from the bit map codes, a color of painting is taken out to store into the memory 27 (step 175). From the central position, the radius and the color of painting, coincident RGB data are taken out from the bit map data file 24 to store into the memory 27 (step 176). In this embodiment, although the rectangle and the circle are exemplified, of course, other graphics such as a triangle, a star and the like may be done.

Figure 21:
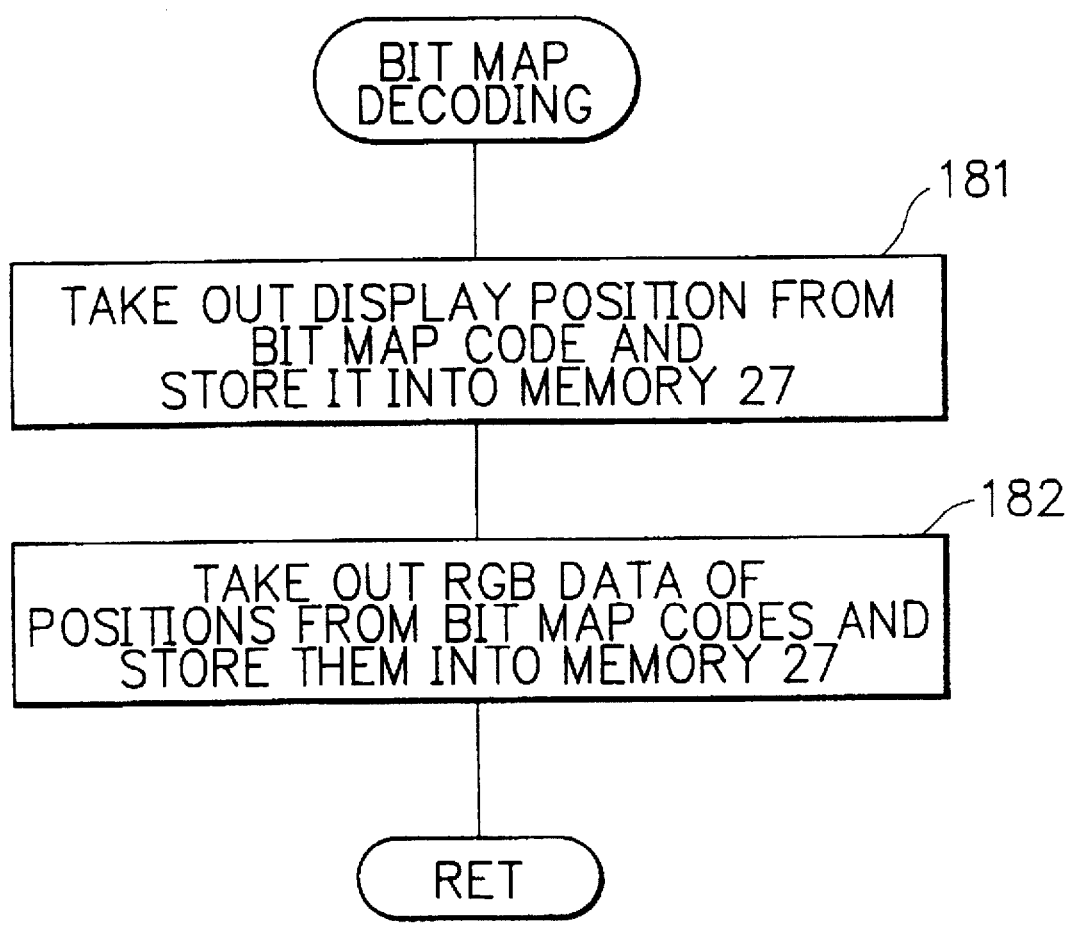
FIG. 21 is a flow chart of a bit map decoding in the present system.

FIG. 21 is a flow chart of a bit map decoding. For the bit map decoding, first, from the bit map codes, a display position is taken out to store into the memory 27 (step 181), and from the bit map codes, the RGB data at the positions are taken out to store into the memory 27 (step 182).

Figure 22:
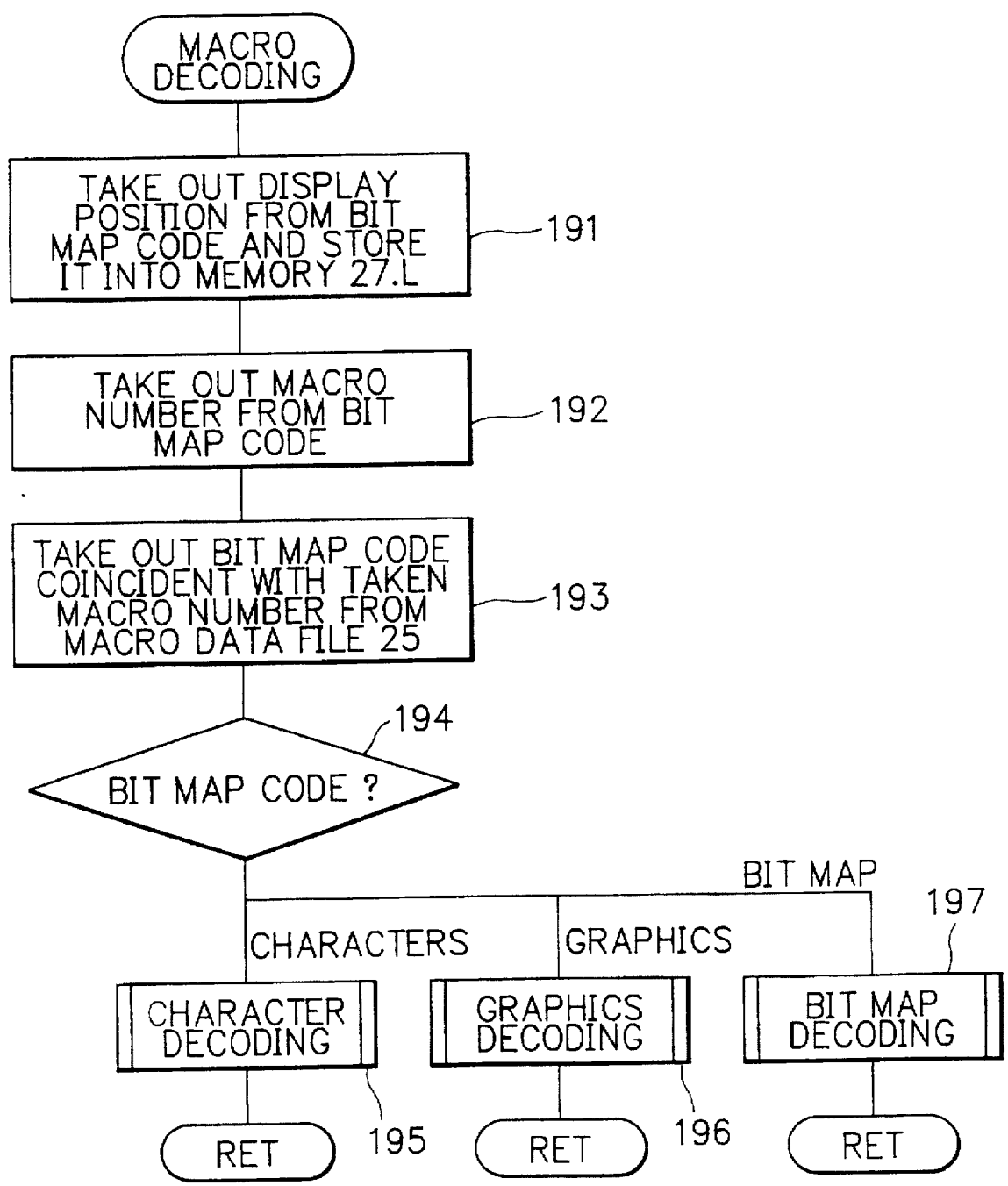
FIG. 22 is a flow chart of a macro decoding in the present system.

FIG. 22 is a flow chart of a macro decoding. For the macro decoding, first, from the bit map codes, a display position is taken out to store into the memory 27 (step 191). From the bit map codes, a macro number is taken out (step 192), the bit map code coincident with the taken macro number is taken out from the macro data file 25 (step 193), a type of the bit map code is discriminated (step 194), and in the case of a character, a character decoding is performed (step 195). On the other hand, in the case of a graphic, a graphic decoding is executed (step 196), and in the case of bit map, a bit map decoding is carried out (step 197).

In this way, by referring to the bit map data file 24 and the macro data file 25, the terminal can decode the bit map codes.

Figure 23:
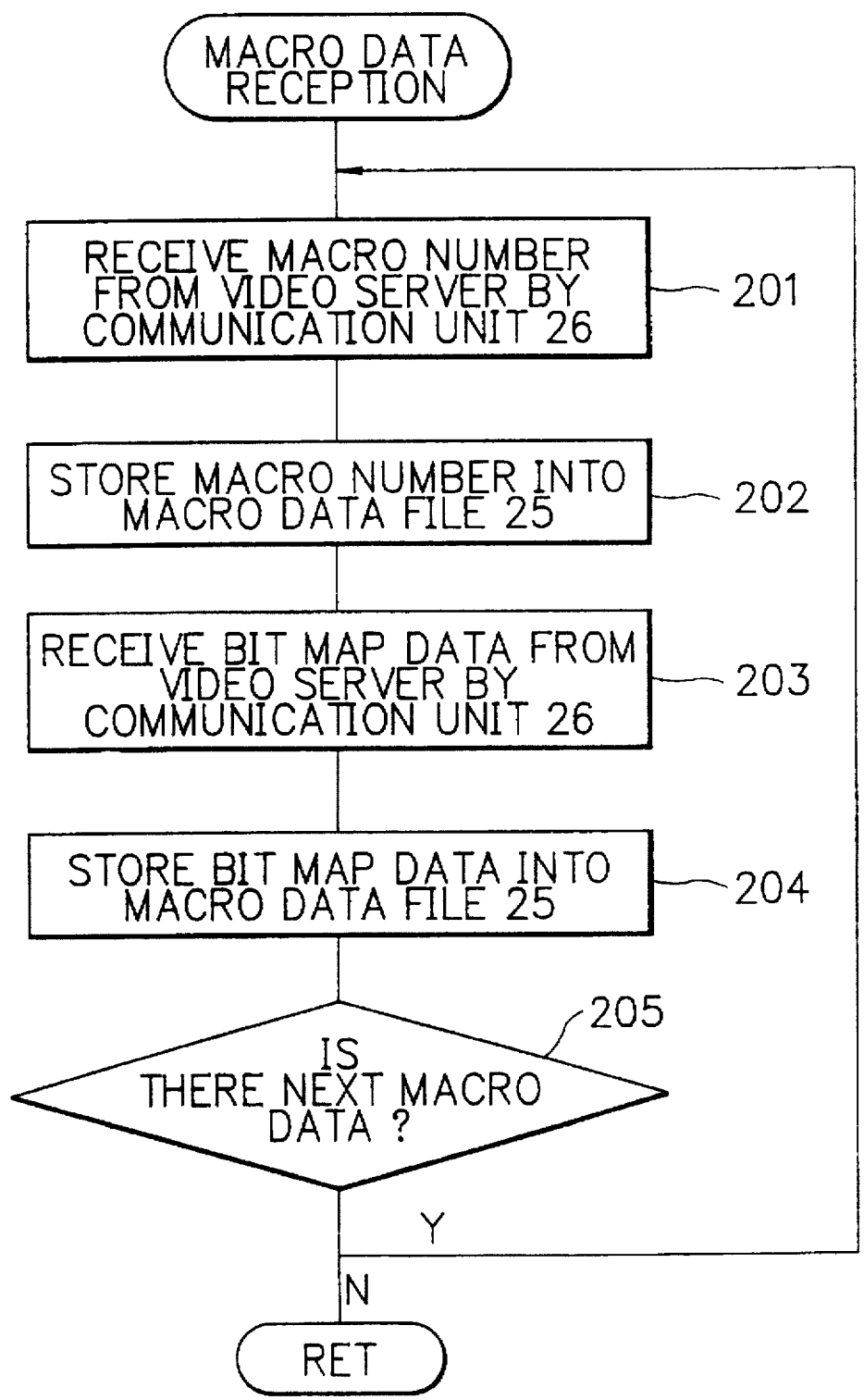
FIG. 23 is a flow chart of a macro data receiving in the present system.

FIG. 23 is a flow chart of a macro data reception. The macro data reception is described as follows. First, a macro number is received from the video server by the communication unit 26 (step 201) and is then stored into the macro data file 25 (step 202). Bit map data are received from the video server by the communication unit 26 (step 203) and are then stored into the macro data file 25 (step 204). Next, it is discriminated whether or not there are next macro data (step 205), and, when there are the next macro data, return to step 201. When there is no next macro data, the processing is ended.

As described above, according to the present invention, the characters and the graphics are separately encoded and high quality images can be reproduced. Further, by inspecting the registration of the bit map data of each terminal, an optimum encoding can be carried out every terminal. Moreover, by registering the characters and/or the graphics used frequently, a code size can be further compressed.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A motion picture reproducing system transmitting a desired video from a video server to at least one terminal in response to a request of the terminal by bidirectional communication, the video server comprising:

first transmission means for transmitting motion picture codes to the terminal, first transmission means containing codes of data representing RGB values of dots of characters, graphics and a rectangle region in a user region of the motion picture codes, the data being hereinafter referred to as a bit map;

discrimination means for discriminating whether or not data of the character and graphic are registered in the terminal; and second transmission means for transmitting bit map data to the terminal in the case of the data of the character and graphic which are not registered in the terminal.

2. A motion picture reproducing system of claim 1, wherein the terminal includes means for reproducing the characters, the graphics and the codes of the bit map stored in the user region of the motion picture codes.

3. A motion picture reproducing system of claim 2, wherein the video server further including means for registering the characters, the graphics and the codes of the bit map which are frequently used, to the terminal, and the terminal further including means for registering the characters, the graphics and the codes of the bit map which are frequently used.

* * * * *

UNITED STATES PATENT AND TRADEMARK OFFICE
CERTIFICATE OF CORRECTION

PATENT NO.   : 5,699,472
DATED        : December 16, 1997
INVENTOR(S)  : Hiroaki UEDA It is certified that error(s) appears in the above-identified patent and that said Letters Patent is hereby corrected as shown below:

col. 3, line 30, delete "i.s" and insert --is-- col. 7, line 41, delete "3104" and insert --S104-- col. 9, line 6, delete "ito" and insert --into--

Signed and Sealed this

Thirty-first Day of March, 1998

Attest:

BRUCE LEHMAN

Attesting Officer        Commissioner of Patents and Trademarks